H. H. WELCH.
SPEEDOMETER.
APPLICATION FILED OCT. 24, 1914.

1,159,816.

Patented Nov. 9, 1915.
2 SHEETS—SHEET 1.

Witnesses:

Inventor:
Horace H. Welch.
by Burton & Burton
his Attys.

H. H. WELCH.
SPEEDOMETER.
APPLICATION FILED OCT. 24, 1914.
1,159,816.
Patented Nov. 9, 1915.
2 SHEETS—SHEET 2.
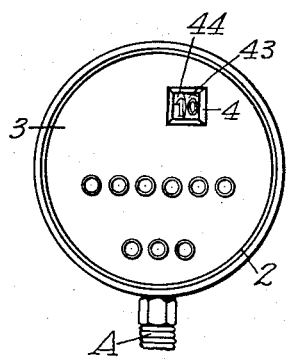
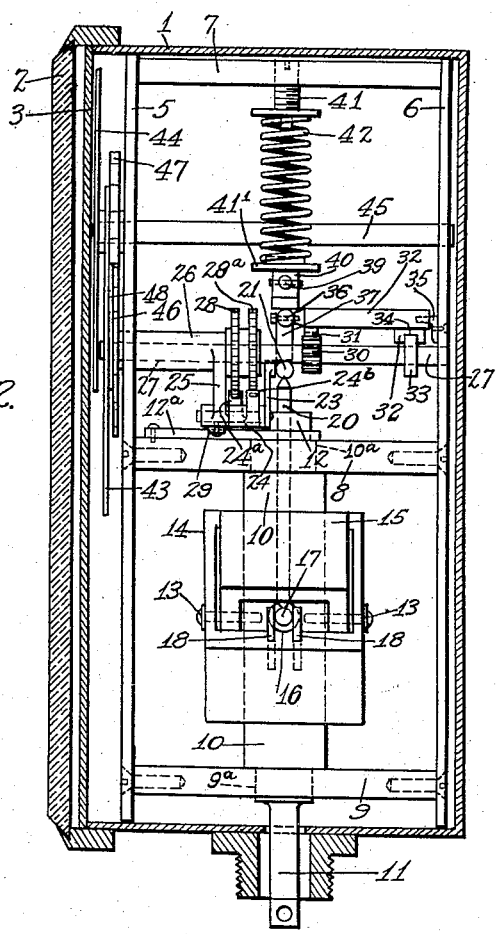
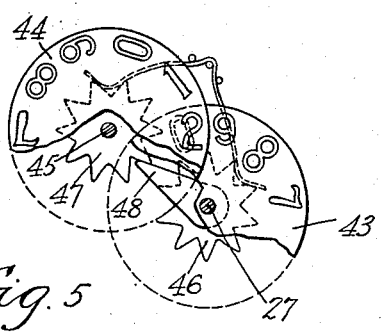
Witnesses:
Inventor:
Horace H. Welch.
by Burton & Burton
his Attys.

UNITED STATES PATENT OFFICE.

HORACE H. WELCH, OF CHICAGO, ILLINOIS, ASSIGNOR TO STEWART-WARNER SPEEDOMETER CORPORATION, OF CHICAGO, ILLINOIS, A CORPORATION OF VIRGINIA.

SPEEDOMETER.

1,159,816.        Specification of Letters Patent.        Patented Nov. 9, 1915.

Continuation of application Serial No. 617,810, filed March 30, 1911. This application filed October 24, 1914.
Serial No. 868,418.

*To all whom it may concern:*

Be it known that I, HORACE H. WELCH, a citizen of the United States, residing at Chicago, in the county of Cook and State of Illinois, have invented new and useful Improvements in Speedometers, of which the following is a specification, reference being had to the accompanying drawings, forming a part thereof.

This application is a continuation of my application, Serial No. 617,810, filed March 30, 1911, which became abandoned through oversight.

The purpose of this invention is to provide an improved construction in speedometers, and it consists in the elements and features of construction shown and described as indicated in the claims.

Figure 1:
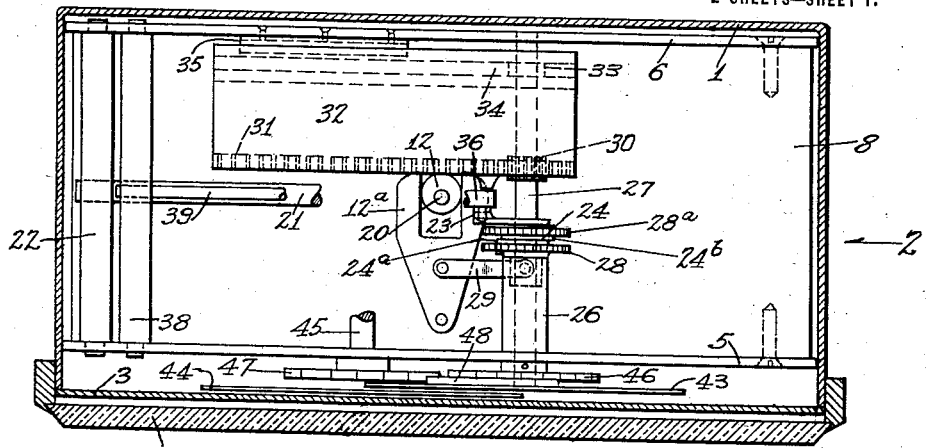
Figure 3:
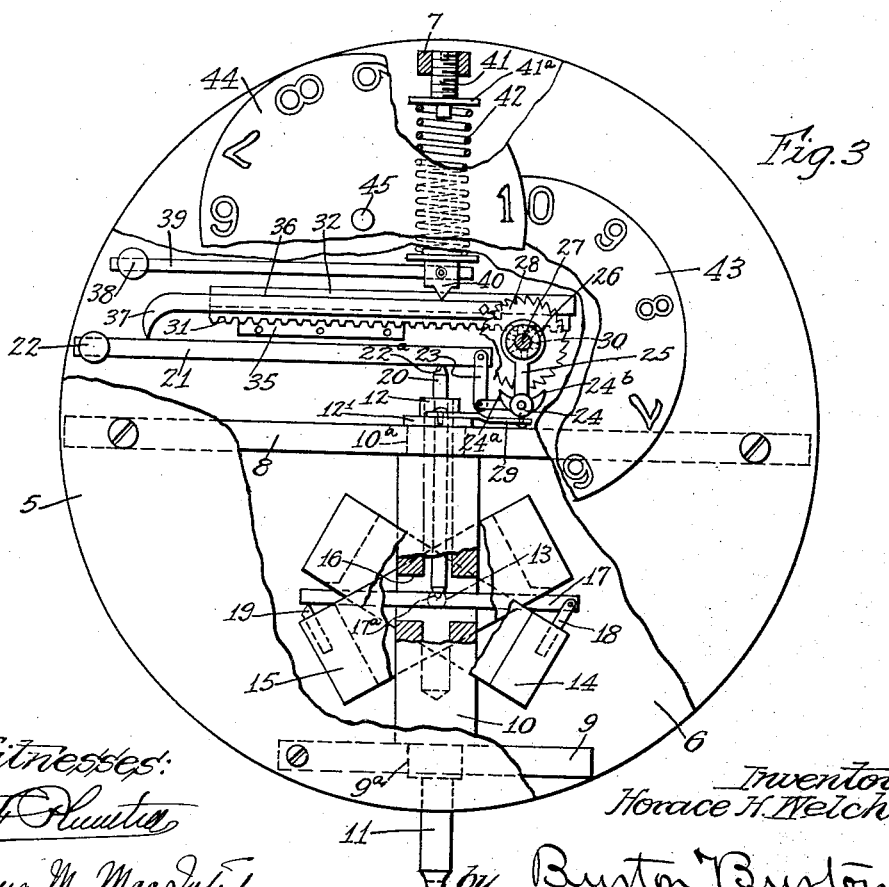

In the drawings: Figure 1 is a top plan view of a speedometer constructed in accordance with this invention with the casing thereof in section. Fig. 2 is a side elevation of the same looking in the direction indicated by the arrow on Fig. 1 with the casing in section. Fig. 3 is a face view with the casing removed and having parts broken away to show the construction and arrangement of the mechanism more clearly. Fig. 4 is a face view with the casing in place and illustrating how the numbers indicating the speed will appear. Fig. 5 is a detail of the speed-indicating means.

This invention is designed especially to be used in connection with motor vehicles and the like, in which the mechanism is driven by a flexible shaft from one of the vehicle wheels. But it is adapted for indicating the speed of rotation of any rotating shaft to which it may be connected. When applied to indication of the speed of the vehicle, the power connection has usually been made so that a centrifugal device is driven thereby which in turn communicates its movement to the speed-indicating devices of the instrument. And in such instruments as heretofore commonly constructed, not only is the amount of movement of the indicating device determined by the centrifugal movement, but also the power for moving the indicating device is derived from the centrifugal movement of said centrifugal devices. It is usual for accurate indication of speed that there should be a graduated member coöperating with a moving member, and it has been usual in such devices that one of said coöperating members is pivoted for oscillation. The oscillating member oscillates widely under the jar of the vehicle when the latter is moving rapidly, while the momentum of the centrifugal weight acting upon the delicate indicating machinery tends to disturb its accuracy of action and to wear out the frictional parts.

In my improved speed indicator, the indicating devices are moved directly by the vehicle. The centrifugally acting weights do not furnish power to move the indicating means, but determine when the indicating means shall be moved by the power derived from the vehicle. The speed indicating means are controlled by opposing pressures, the means for creating which are so arranged that when the vehicle, or the like, on which the speedometer is used is running at a steady speed the opposing pressures will be equal and the devices for moving speed indicating means will be thrown out of operation; but when the speed of the vehicle is increasing or decreasing, one or the other of the two opposing pressures will predominate and throw the devices for moving the speed-indicating means into operation in one direction or the other according to which is the predominating pressure.

The balance thus provided is so delicate that the controlling weights are always at practically the same distance from each other, and preferably at the point of maximum efficiency, *i. e.*, forty-five degrees. There are thus substantially no inaccuracies due to friction and wear, and I am able to use a figured disk indicator which is free from vibration and definite in indication.

Other objects and their resultant advantages will be understood from the following description by reference to the drawings.

Structurally, my invention comprises an outer casing, 1, a glass face plate, 2, a thin opaque disk, 3, arranged directly behind the glass, 2, and provided with a suitable opening, 4, through which the speed indication may be read.

The framework which supports the several parts of the speedometer proper comprises front and rear plates, 5 and 6, respectively, held at a suitable distance apart by upper, intermediate and lower cross-pieces, 7, 8 and 9, respectively.

The main power shaft of the speedometer is indicated at 10, and, as most clearly shown in Figs. 2 and 3, extends vertically between the intermediate and lower cross-pieces, 8 and 9, respectively, and is rotatably mounted in openings, 9$^a$ and 10$^a$, forming the bearings of said shaft therein. The lower end of the power shaft, 10, below the lower cross piece, 9, is reduced in diameter and extends through the outer casing, 1, to provide for the attachment thereto of one end of a flexible shaft, A, by means of which rotary motion is transmitted to the power shaft, 10, from one of the carrying wheels of the vehicle upon which the instrument is mounted. The upper end of the power shaft, 10, also extends a short distance above the intermediate cross-piece, 8, and is turned to form an eccentric, 12, for a purpose to be hereinafter referred to. About midway between the cross-pieces, 8 and 9, the power shaft, 10, has fixed thereto a stub-shaft, 13, upon which are pivotally mounted governors, 14 and 15, which control the operation of my speedometer in a manner to be hereinafter described. Passing through a longitudinal slot in the power shaft and extending at right angles to its axis and at right angles also to the line of the stub-shaft, 13, there is a small rod, 17, forming a cross-bar of said shaft, 10. To one end of this cross-bar, one end of the governor, 14, is connected pivotally by means of short lugs, 18, projecting rigidly from said end of said governor member, 14. Upon the opposite end of said cross bar, the knife-edge end of a lug, 19, attached to the end of the other governor bears at a point corresponding in distance from the axis of the shaft, 10, to that of the pivotal connection of the lug, 18, to the opposite end of said cross-bar, 17. By these connections of the governors, 14 and 15, the cross-bar, 17, is adapted to be raised and lowered along the axis of the power-shaft, 10, by the centrifugal movement of the governors, 14 and 15, derived from the rotary movement of the power-shaft, 10, and determined in extent by the velocity of that rotary movement.

A small push rod, 20, having its ends pointed is placed in an axial bore formed in the power shaft, 10, and its lower end is stepped in a depression, 17$^a$, formed in the upper side of the cross-bar, 17, while its upper end extends a short distance above the eccentric, 12, and is stepped in a depression, 22$^a$, formed in the under side of a horizontal lever, 21, which is attached to a shaft, 22, which is loosely mounted on the front and rear plates, 5 and 6, respectively, of the framework. The inner or free end of the lever, 21, extends slightly past the center of the power shaft, 10, and has pivoted to it the upper end of a link, 23, the lower end of which is pivotally connected to a double pawl, 24, having oppositely presented ratchet engaging points, 24$^a$, 24$^b$. The pawl, 24, is pivotally mounted upon the downwardly-extending arm, 25, of a sleeve, 26, which is loosely mounted on a transverse shaft, 27, carried by the front and rear plates, 5 and 6, respectively, and free to turn in its bearings. Pivoted to the intermediate cross-piece, 8, near the front plate, 5, is the outer end of an arm, 12$^a$, the inner end of which is forked and adapted to straddle the eccentric, 12, thereby causing the arm, 12$^a$, to swing on its pivot whenever the eccentric is in motion. A link, 29, connected at one end to the arm, 12$^a$, and at the other end to the downwardly-extending arm, 25, of the sleeve, 26, will cause said arm, 25, and consequently the double pawl, 24, to oscillate. Right-and-left hand ratchet wheels, 28 and 28$^a$, respectively are fixed to the shaft, 27, above the pawl, 24, and in position to be engaged by the points, 24$^a$ and 24$^b$, respectively of the pawl in the manner to be hereinafter described, said ratchet wheels constituting alternative means by which the mechanism for controlling the speed-indicating devices is operated. There is also fixed to the shaft, 27, a small pinion, 30, which engages a rack, 31, formed on the under side of a sliding bar, 32, which bar is guided in its movement by means of a collar, 33, formed on the shaft, 27, and working in a groove, 34, formed on the under side of the bar, 32. The bar is further supported by a bracket, 35, secured to the rear plate, 6, of the framework.

Pivotally secured to the front side of the sliding bar, 32, is one end of the lever, 36, the other end of said lever, as most clearly seen in Fig. 3, is flattened and bent downward as seen at 37, and is adapted to contact the upper side of the lever, 21, and to slide back and forth there-along with the movement of the sliding bar, 32.

Loosely mounted on the front and rear plates, 5 and 6, respectively of the framework above the shaft, 22, are the ends of a similar shaft, 38, and to said shaft, 38, there is fixed the end of a horizontally-extending arm or lever, 39. To the other end of said arm, 39, there is fixed a shoe, 40, having a comparatively sharp flat lower end adapted to engage the upper side of the lever, 36. Screwed into the upper cross-piece, 7, above the shoe, 40, is a screw, 41, having its lower end provided with a central washer, 41$^a$, between which and the top of the shoe, 40, there is placed a coiled spring, 42. The purpose of this coiled spring is to exert downward pressure on the lever, 21, through the shoe, 40, and lever 36, to equalize and overcome the upward thrust of the lever, 21, derived from the governors, 14 and 15, through the rod, 17, and shaft, 20, for the purposes and in the manner to be presently described.

The speed-indicating means which I preferably employ are most clearly illustrated in Fig. 5 of the drawings, and comprise a pair of dials, a units dial, 43, fixed to the shaft, 27, and a tens dial, 44, fixed to the shaft, 45, loosely mounted in the front and rear plates, 5 and 6, respectively. Each of the dials, 43 and 44, is numbered from zero to nine. Fixed to the shafts, 27 and 45, immediately behind their respective dials, are wheels, 46 and 47, respectively, each having ten teeth or points. Also fixed to the shaft, 27, and turning with the wheel, 46, is a finger, 48, which extends outwardly toward the wheel, 47, and is adapted to engage the points of the wheel, 47, which engagement will obviously occur once every time the units dial, 43, makes a complete revolution. This will move the tens dial, 44, one point forward or backward, depending on the direction which the units wheel is turning. The numbers on the dials being directly opposite, will indicate the number of miles per hour being traveled by the vehicle, and may be quickly and accurately read through the opening, 4, in the disk, 3.

The operation of the structure above described is as follows: The positions in which the several parts of my invention appear in Figs. 1, 2 and 3, are those in which the parts will be when the machine is running at a certain speed, in this instance, ten miles per hour. All of the parts remain stationary except the power shaft, 10, governors, 14 and 15, and pawl, 24; and the pawl is caused to operate back and forth by the eccentric, 12, and its arm, 12$^a$, and the link, 29, whenever the power shaft, 10, is rotating; but the points, 24$^a$ and 24$^b$, of the pawl will be out of engagement with the teeth of the ratchet wheels, 28 and 28$^a$, respectively, except when the velocity of the power shaft, 10, is increasing or decreasing. It may be stated here that to set the mechanism of my speedometer so that the parts will assume the position in which they are shown in Figs. 2 and 3, whenever the vehicle is running at an even speed, no matter what that speed may be, it is simply necessary to rotate the power shaft, 10, at a given speed and to adjust the tension of the coil spring, 42, by means of the screw, 41, so that the downward pressure of said spring, 42, on the lever, 21, through the shoe, 40, and lever, 36, will be equal to the upward pressure of governors, 14 and 15, on said lever, 21, which will cause the points, 24$^a$ and 24$^b$, of the pawl, 24, to be out of engagement with the ratchet wheels, 28 and 28$^a$, respectively when the speed at which the power shaft is turning is indicated on the dials, 43 and 44. For example; assume that the vehicle is running at a speed of ten miles per hour and its speed increases. The increase in the speed of the vehicle will cause the power shaft, 10, to rotate faster, which in turn will give greater momentum to the governors, 14 and 15, and cause them to swing out toward a horizontal position; this movement of the governors will raise the rod, 17, and shaft, 20, a slight distance. This in turn will swing the inner end of the lever, 21, upward and cause the link, 23, to tilt the pawl, 24, and bring its point, 24$^a$, into contact with the teeth of the ratchet wheel, 28, whereupon, owing to the oscillatory movement given the pawl, 24, by the eccentric, 12, through its arm, 12$^a$, and the link, 29, the ratchet wheel, 28, will be turned to the right as seen from the front, i. e., in the direction of the hands of a clock. As said ratchet wheel, 28, is keyed to the shaft, 27, said shaft will also be turned to the right, which in turn will advance the units dial, 43, to the right, together with its pointed wheel, 46, and finger, 48. The pinion, 30, will also rotate to the right, and since said pinion is in mesh with the rack, 31, of the sliding bar, 32, said sliding bar will be caused to slide to the right, drawing the lever, 36, with it, thereby moving its end, 37, nearer the shaft, 20, and at the same time bringing said end, 37, of the lever, 36, nearer the shoe, 40. It will be understood that as long as the speed of the power shaft, 10, is increasing, there will be an increase of the upward thrust of the lever, 21, through the shaft, 20, from the governors, 14 and 15; also the downward pressure on the lever, 12, from the spring, 42, through the shoe, 40, and lever, 36, will become greater as the sliding bar, 32, moves to the right, whereby the forces applied at the points, 40 and 37, are moved farther from the fulcrums of the levers, 36 and 21, respectively. This causes the force exerted at 40 to be transferred to the shaft or push rods, 20, in proportion to the square of the distance traversed by the lever, 36. It will be observed that the short arms of the two levers should be substantially equal, and that they will so remain whatever the relative positions of the levers. When the speed of the power shaft, 10, becomes constant and the upward thrust on the lever, 36, from the governors, 14 and 15, through the rod, 17, and shaft, 20, becomes constant, and as soon as the longitudinal movement of the lever, 36, caused by the pawl and ratchet device and the pinion, 30, engaging with the rack bar, 32, and shifting the points of bearing of the point, 37, and shoe, 40, causes said upward thrust to be counter-balanced by the downward pressure of the coil spring, 42, on said lever, 21, through the lever, 36, and shoe, 40, the lever, 21, will return to a horizontal position. When this occurs the link, 23, will tilt the pawl, 24, and move the point, 24$^a$, out of engagement with the ratchet wheel, 28, stopping the rotation of the shaft, 27. As soon as the speed of the vehicle or power shaft, 10, decreases, the upward thrust of the governors decreases in power sufficiently to allow the downward pressure of the spring, 42, to overcome said upward thrust, and the point, 37, of the lever, 36, will then move the inner end of the lever, 21, down below a horizontal position, whereupon, the link, 23, will tilt the pawl, 24, to cause its point, 24ᵇ, to engage the teeth of the left-hand ratchet wheel, 28ᵃ. This will cause the shaft, 27, to be rotated to the left, i. e., oppositely to the direction of rotation of the hands of a clock, causing the units dial, 43, with its pointed wheel, 46, and finger, 48, to turn in the same direction. The pinion, 30, rotating to the left with the shaft, 27, will cause the sliding bar, 32, with the lever, 36, to move to the left, thereby decreasing the leverage operating in favor of the lever, 36, for resisting the upward movement of the lever, 21, in accordance with the decreasing upward thrust thereon from the governors, 14 and 15, so that when the power shaft, 10, attains a uniformly steady speed and the upward thrust on the lever, 21, becomes constant, said upward thrust will be counter-balanced by the downward pressure exerted on said lever, 36, by the spring, 42, and the aforesaid lever, 21, will again assume a horizontal position, whereupon the link, 23, will again tilt the pawl, 24, to disengage its point, 24ᵇ, from the teeth of the ratchet wheel, 28ᵃ, thereby stopping the rotation of the shaft, 27, and the movement of all the parts controlled thereby.

From the foregoing it will be seen that as long as the speed of the vehicle, and consequently that of the power shaft, 10, is steady, the upward thrust on the lever, 21, from the governors, 14 and 15, and the downward pressure thereon from the spring, 42, will be equal, and the lever, 21, will occupy a horizontal position, and the pawl, 24, will have no effect on the ratchet wheels, 28 and 28ᵃ; but when the speed is increasing, the upward thrust increases to overcome the downward pressure and the speed-indicating means are thrown into operation; and at the same time the downward pressure is increasing so that just as soon as the speed becomes steady, said downward pressure will counter-balance the upward thrust and throw the speed-indicating means out of operation; also when the speed decreases and the downward pressure overcomes the upward thrust and again throws the speed-indicating means into operation, but in the reverse direction from that in which they operate when the speed is increasing, said downward pressure is decreased by the shifting of the position of the lever, 36, and becomes counter-balanced by the upward thrust just as soon as the speed of the power shaft 10, again becomes steady, whereupon the lever, 21, will return to horizontal position and the speed-indicating means will be thrown out of operation.

It may be observed as a further explanation of the action of the apparatus, that while the parts, including the shaft, 27, link, 23, bar, 32, etc., which may for convenience be called the control mechanism, are moved a distance which is directly proportioned to the speed of rotation of the driving shaft, 10, the upward thrust of the shaft, 20, increases as the square of the velocity with which the centrifugal governors, 14 and 15, revolve. As this force increases, it is exerted against the constantly increasing purchase of the levers, 21 and 32, and a condition of balance may always be attained as above described, because of the fact that moment of the resultant force exerted by the lever, 21, upon the thrust rod, 20, is proportional to the product of the moments of 21 and 36, or to the square of one of the moment arms, since the two arms are always equal. In the operation of the device accelerating or diminishing the speed is in effect weighed as an increasing or a decreasing load against corresponding increasing or decreasing leverage. The mechanism acts constantly to indicate these changes, and only ceases its action when a steady speed corresponding to a condition of equilibrium is maintained.

While I have shown and described my invention in the preferred form, it will be understood that various changes may be made in the construction of its several parts without departing from the spirit thereof, and no limitation is implied by reason of the particular structure shown.

I claim:

1. In a speedometer in combination with speed-indicating means and actuating devices therefor, comprising a shaft adapted to be driven by a shaft whose speed is to be indicated, and comprising alternative connections for actuating the speed-indicating mechanism in opposite directions; controlling mechanisms for engaging and disengaging said alternative connections; and means actuated by said first mentioned shaft operating on the controlling mechanism for effecting such disengagement when said shaft is rotated at a constant speed.

2. In a speedometer in combination with speed-indicating means and actuating devices therefor, comprising a power shaft and alternative connections for actuating said speed-indicating means in opposite directions; controlling mechanism for engaging and disengaging said alternative connections, and means actuated by said power shaft for effecting such disengagement when the power shaft is revolving at a constant speed, said controlling mechanism having a spring which tends to shift said engagement in one direction, and speed-responsive devices operated by the power shaft, tending to shift the engagement in the opposite direction.

3. In a speedometer in combination with speed-indicating means and actuating devices therefor, comprising a power shaft and alternative connections for actuating said speed-indicating means in opposite directions; controlling mechanism for engaging and disengaging said alternative connections; means for imposing continuous pressure on said controlling mechanism tending to move it in direction for effecting one of said alternative engagements; means operated by the power shaft for imposing pressure tending to move said mechanism in direction for causing the opposite alternative engagement, and means actuated with said first mentioned actuating devices for equalizing said pressures.

4. In a speedometer in combination with speed-indicating means and actuating devices therefor, comprising a power shaft and alternative connections for actuating said speed-indicating means in opposite directions; controlling mechanism for engaging and disengaging said alternative connections, comprising levers and movable fulcrums for the levers; a spring which imposes continuous pressure upon said lever mechanism, tending to shift said engagement in one direction; centrifugal devices operated by the power shaft; connections therefrom operating to shift said lever mechanism in the opposite direction; means actuated by said alternative engagement for shifting the lever fulcrums in opposite directions by said engagements respectively, said fulcrums being movable by said means to position for equalizing the pressure of the centrifugal devices and the pressure of said spring.

5. A speedometer comprising speed indicating means and actuating devices therefor, comprising a pawl and ratchet adapted for transmitting motion in either of two opposite directions, and automatic means for throwing said pawl-and-ratchet devices out of operation comprising mechanism which derives its movement from acceleration of the shaft whose speed is to be indicated.

6. A speedometer comprising speed indicating means and actuating devices therefor, comprising a pawl-and-ratchet device adapted for transmitting motion to said speed indicating means in either of two opposite directions, a lever for throwing said pawl-and-ratchet devices out of operation and means for actuating the lever, comprising mechanism which derives its movement from acceleration of the shaft whose speed is to be indicated.

7. A speedometer comprising speed indicating means and actuating mechanism therefor, comprising a pawl-and-ratchet device adapted for transmitting motion in either of two opposite directions; mechanism for controlling the pawl-and-ratchet device, and means for creating opposing pressures on said controlling mechanism to throw said pawl-and-ratchet device into and out of operation.

8. In a speedometer, the combination with speed indicating means, of control mechanism therefor, alternative means for moving said control mechanism in either direction, means adapted to be driven by a vehicle wheel for operating said alternative means, and a lever adjustably fulcrumed and moving in relation to said control mechanism for placing the same out of operative action with said alternative means when propelled at uniform speed.

9. In a speedometer, a driving shaft or spindle, a push rod movably carried by said spindle, a centrifugal balance on the spindle including means to actuate the push rod; speed indicating means; means for moving the same; a disengageable device actuated by the spindle and alternatively engageable with said last-named means to move the same to the right or to the left, and mechanism controlled by the push rod for operatively engaging said alternatively engageable device in one direction, and mechanism controlled by the means for moving said speed indicating means for operatively engaging said device in the other direction.

10. In a speedometer, a driving shaft or spindle, a push rod axially mounted and longitudinally slidable in the spindle, a centrifugal balance on the spindle including means to actuate the push rod; speed indicating means; rotatable means for moving said speed indicating means, an alternatively engageable pawl-and-ratchet device for moving said means to the right or to the left; means driven by the spindle for giving reciprocating motion to said device; mechanism controlled by the push rod for operatively engaging said pawl-and-ratchet device in one direction, and mechanism controlled by the means for moving the speed-indicating means for operatively engaging said pawl-and-ratchet device in the other direction.

11. In a speedometer, a revoluble driving spindle, control mechanism including a slidable member, a device by which forward or backward movement alternatively may be given to the control mechanism by the driving member; a centrifugal governor mounted on the driving spindle; means including a lever pivoted at one end and movable by said governor to swing said lever so as to direct said alternative device in operating the control mechanism; a lever provided with a stationary fulcrum pivoted at one end to said slidable member and having its other end adapted to slide on the last-named lever.

12. In a speedometer, a revoluble driving spindle, control mechanism; a device by which the control mechanism may be actuated by the driving member; a centrifugal governor rotated by the driving spindle; a balancing apparatus; means impelled by said centrifugal governor and operating on said balancing apparatus to cause said device to operate the control mechanism, said balancing apparatus being interposed between the last-mentioned means and the control mechanism, whereby the movement of the latter is directly proportioned to the speed of the centrifugal governor.

13. In a speedometer, a revoluble driving spindle, control mechanism, a device by which the control mechanism may be actuated by the driving member; a centrifugal governor mounted on the driving spindle and rotated thereby; a balancing apparatus; means impelled by said centrifugal governor and operating on said balancing apparatus to cause said device to operate the control mechanism, said balancing apparatus being interposed between the last-mentioned means and the control mechanism, whereby the movement of the latter is directly proportional to the speed of the centrifugal governor.

14. In a speedometer, the combination of a revoluble spindle, a centrifugal governor mounted on the spindle; a plurality of levers arranged above said governor, and means for exerting a pressure thereon for creating an opposing force adapted to counter-balance the centrifugal force exerted by said governor when at a predetermined distance from the center of the spindle; speed indicating means; a pawl-and-ratchet device, and means driven by the spindle and connected to said pawl-and-ratchet device for operating said speed indicating means in accordance with the preponderance of said opposed forces.

15. In a speedometer, a driving spindle, centrifugal devices for producing a thrust in relation to the speed of the driving spindle; a lever pivoted at one end to a fixed support; means impelled by said devices and adapted to impart the said thrust to the other end of said lever; a movable support; a second lever having one end pivoted to said movable support and whose other end is adapted to slide upon the first-mentioned lever; a stationary spring adapted to bear upon the second lever at a point whose distance from the pivot of the second lever is always equal to the distance from the point of contact of the two levers to the point of the first-mentioned lever; means for moving the second lever and its support to a position of equilibrium between the said thrust and the pressure exerted by the spring upon the second lever; speed-indicating means, and a pawl-and-ratchet device for operating said speed-indicating means in relation to the movement of the aforesaid second lever due to the movement of the aforesaid movable support, substantially as described.

16. In a speedometer having elements adapted to move in proportion to the speed of a moving vehicle, the combination with said elements and actuated thereby of speed-indicating means comprising a plurality of numbered disks and means for relatively moving said disks to indicate consecutive numbers.

17. In a speedometer having elements moved by a moving vehicle and independent means for controlling said elements relatively to the speed of said vehicle, the combination therewith of speed indicating means comprising a plurality of numbered disks and means for relatively moving said disks to indicate consecutive numbers.

18. A speedometer comprising speed indicating means, alternatively operating means for moving said speed indicating means in either direction; means connecting said lever to the last-mentioned means; centrifugally controlled means for exerting an upward thrust on said lever, and means arranged above said lever for exerting the upward thrust and downward pressure on said lever so arranged that when the speed of the power shaft is steady said upward thrust will be counterbalanced by the downward pressure, and the lever will be held in its normal position with the first-metnioned means out of operative action with the speed-indicating means, but when the speed of the power shaft is on the increase said upward thrust will overcome the downward pressure and swing the lever above its normal position with the first-mentioned means into operative action with the speed indicating means to move the same.

19. A speedometer comprising speed-indicating means, alternatively operated means for moving said means in either direction; a lever; means connecting said lever to said last-mentioned means; a main power shaft; governors pivoted to said power shaft; means for connecting said governors and the aforesaid lever to transmit the thrust of the governors caused by the rotation of the power shaft to said lever so as to shift the same to throw the aforesaid last-mentioned means into operation to move the speed-indicating means forward, and means arranged on the other side of said lever for exerting an opposing pressure thereon to counterbalance said thrust when the speed of the power shaft becomes steady so as to return the lever to its normal position and throw said last-mentioned means out of forward operation and to overcome said thrust when the speed of the power shaft is on the decrease to move the lever below its normal position and throw said last-mentioned means into operation to move the speed indicating means backward.

20. A speedometer comprising speed indicating means, alternatively operated means for moving said speed indicating means in either direction; a lever; a link connecting said lever to said last-mentioned means; a main power shaft; governors pivoted to said power shaft; a cross bar supported by said governors and movably mounted on the power shaft; a push rod connecting said cross bar to the aforesaid lever to transmit the upward thrust of the governors caused by the rotation of the power shaft to said lever to raise the same and throw the aforesaid alternatively operated means into forward operation, and spring-pressed means arranged above said lever to exert a downward pressure thereon to counterbalance the upward thrust when the speed of the power shaft becomes constant, and to overcome said upward thrust when the speed of the power shaft decreases so as to throw said alternatively operated means out of forward and into backward operation, to move the speed-indicating means forward and backward, respectively.

21. A speedometer comprising speed indicating means, alternatively operated means for moving said speed indicating means in either direction; a lever and a link for controlling said last-mentioned means; a power shaft; means operated by said power shaft and connected with said alternatively operated means for causing the same to oscillate back and forth continually as long as the power shaft is in motion, and means for creating opposing pressures on said device to throw the aforesaid last mentioned means into and out of operative action with the speed-indicating means.

22. A speedometer comprising speed indicating means, a vertical power shaft, a transverse shaft arranged above said power shaft, means carried by said transverse power shaft for turning the same in either direction, a horizontally extending pivoted lever for controlling said last-mentioned means; means carried by said power shaft for exerting an upward thrust on said lever, and means arranged above said lever for exerting a downward pressure thereon, said latter means comprising a sliding rack, a lever pivoted at one end of said rack and having its other end bearing on the aforesaid horizontally extending lever, a pivoted arm, a shoe fixed to said arm and having its lower end in contact with the last-mentioned lever, and a spring bearing down on said shoe and means for adjusting the tension of said spring, a rack formed on the under side of the sliding bar, and a pinion fixed to the aforesaid transverse shaft to engage said rack.

23. A speedometer comprising speed indicating means, alternatively operated means for moving said speed indicating means in either direction, a lever and a link for controlling said last-mentioned means, a power shaft, means carried thereby for exerting an upward thrust on said lever, said means being such that when the speed of the power shaft is steady the upward thrust will be uniform, and when the speed of the power shaft increases or decreases, said upward thrust increases and decreases respectively, means arranged above the aforesaid lever for exerting a downward pressure thereon, said means comprising a lever bearing on said first-mentioned lever, a shoe bearing on the said last-mentioned lever and a spring bearing down on said shoe, and a sliding rack for moving said last-mentioned lever forward when the upward thrust increases to increase the downward pressure accordingly, and backward when the upward thrust decreases to decrease the downward pressure accordingly, substantially as described.

24. In a speedometer, the combination of a revoluble spindle, a centrifugal governor provided with weights and mounted on the spindle, automatic means for creating a force adapted to counterbalance the centrifugal force exerted by the weights on said governor and hold the same at a substantially constant distance therefrom, a speed indicating device, and means for operating said device in relation to the force exerted by said governor.

25. In a speedometer, the combination of a revoluble spindle, a centrifugal governor operated by said spindle and provided with weights; means for determining the centrifugal force exerted by said weights when revolving in a circle of fixed diameter; speed indicating means and means for operating said speed indicating means in relation to the above-mentioned determined centrifugal force.

26. In a speedometer, the combination of a revoluble spindle, a governor provided with weights mounted on said spindle at a predetermined distance therefrom and adapted to be extended beyond said predetermined distance by centrifugal force when the spindle is operated at increasing speed; means for creating a force to overcome the centrifugal force of said weights and return the same to or within said predetermined distance when said spindle is rotated at decreasing speed, said last-named means and the outward thrust being in equilibrium to hold said weights at said predetermined distance when the spindle is rotated at constant speed; a speed indicating device and means for operating the same in relation to the said opposing forces.

In testimony whereof, I have hereunto set my hand at Chicago, Illinois, this 15th day of October, 1914.

H. H. WELCH.

Witnesses:
LUCY I. STONE,
EDNA M. MACINTOSH.

Copies of this patent may be obtained for five cents each, by addressing the "Commissioner of Patents, Washington, D. C."